Patented June 24, 1930

1,766,705

UNITED STATES PATENT OFFICE

ERICH DEHNEL, OF ROSSEN, NEAR MERSEBURG, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

STABLE AMMONIUM BICARBONATE

No Drawing. Application filed June 8, 1925, Serial No. 35,791, and in Germany June 10, 1924.

My present invention relates to the production of ammonium bicarbonate of such excellent stability that it can be stored and shipped without any material loss and it is therefore, a very useful fertilizer.

I have discovered that the well-known high volatility of ammonium bicarbonate is not a property of the salt itself which in a very pure condition has very good stability in the air. It is rather difficult however, to obtain the salt in a virtually pure condition and it usually contains varying admixtures of other carbonic acid derivatives of ammonia, such as carbonate or carbamate, or various double or triple salts of bicarbonate, carbonate and carbamate. I have found that such admixtures even when present in comparatively small amounts reduce the stability of the salt to an extraordinary degree. Moreover, the frequent inclusion in the salt of ammoniacal mother liquor, and the fact that sometimes it is insufficiently dried, cause an undesirable effect.

The present invention has for its object the avoidance as far as possible of an admixture of other carbonic acid derivatives of ammonium to the bicarbonate and the production of the latter in a dense form without inclusion of mother liquor. This valuable result is effected by allowing the bicarbonate to crystallize from a hot solution in the permanent presence of carbon dioxid (which term includes both carbonic acid and carbon dioxid). Consequently, when crystallization sets in and as long as it takes place, carbon dioxid is introduced into the solution, or a gas rich in carbon dioxid, which also may contain ammonia though less thereof, than would be required to form bicarbonate. The higher the temperature, the higher is the partial pressure of carbon dioxid required.

If aqueous ammonia, or ammonium carbonate solution is saturated with carbon dioxid while cooling, as is usual for promoting absorption, the solution will become saturated with double salts of ammonium bicarbonate, carbonate and other carbamate before being saturated by ammonium bicarbonate and the latter will be contaminated with such other salts. When, however, the temperature is kept high initially and carbon dioxid is continuously introduced, pure bicarbonate will crystallize out on cooling, and when moderate stirring is carried out, it will be obtained in the form of crystal grains of uniform structure and free of, or containing little included mother liquor. The crystals are separated from the mother liquor and well dried and the mother liquor can be utilized in a fresh operation.

For example, aqueous ammonia of from 12 to 15 percent concentration is poured into a cylindrical vessel with a conical bottom and provided with a stirrer; and high grade carbon dioxid is introduced without cooling, the solution assuming a temperature of about 50 degrees centigrade. Crystallization then sets in and the introduction of carbon dioxid is continued while the temperature gradually falls to about room temperature. The salt which has separated out is collected in a centrifuge and then well dried in a revolving furnace drier by means of air of 80 or 90 degrees centigrade. The bicarbonate so obtained has a more glasslike appearance than the usual commercial article and it has the characteristic property of filling, when ground, about the same space as when in the form of crystals. In addition, while other ammonium bicarbonates have suffered a loss of 50 per cent or more in storing, a bicarbonate prepared in accordance with the process described remains nearly unaltered under the same circumstances.

The formation of dense crystals of excellent stability can be further promoted in accordance with the present invention by adding to the bicarbonate solution prior to crystallization bodies increasing the surface tension of the solution. Very efficient additions of such kind are oily liquids, insoluble in water, such for example as benzene, petrol, carbon tetrachlorid, iron carbonyl, tar oils obtained from coal or lignite tar, and the like. Ammonium sulfid and sugar are also suitable, as are also substances reducing the surface tension, for example, propyl- or butyl-substituted naphthalene sulfonic acids which also have an excellent wetting property. Solutions or emulsions of liquids of the first kind prepared with the aid of the last named sulfonic acids, or salts thereof, may also be employed. The quantities of such additions required are very small, generally about 1 percent or less, of the bicarbonate solution.

For example, aqueous ammonia of 15 percent concentration is mixed with about one percent of its weight of tar oil, emulsified with aqua ammonia, and saturation with carbon dioxid and separation of the salt is then carried out as above described. Thereafter, the tar oil is found in the mother liquor, apart from small losses, which mother liquor after making up for the ammonia removed, can be employed afresh. The bicarbonate salt thus obtained excels the salt prepared in the absence of tar oil so far as regards stability in the air.

While the traces of tar oil adhering to the bicarbonate are of no detrimental effect when the salt is to serve as a fertilizer or for industrial purposes, it will be necessary to employ other bodies when a product free from any odoriferous impurities is desired, for example in the case of bicarbonate as a baking powder. Carbon tetrachlorid is very suitable in such cases as traces thereof adhering to the salt evaporate readily. Cane sugar may also be very suitably added in such cases.

Now what I claim is:

1. The process of manufacturing stable ammonium bicarbonate which comprises allowing ammonium bicarbonate to crystallize from a hot solution in the permanent presence of carbon dioxid during crystallization.

2. The process of manufacturing stable ammonium bicarbonate which comprises allowing ammonium bicarbonate to crystallize from a hot solution while passing a gas rich in carbon dioxid through the solution during crystallization.

3. The process of manufacturing stable ammonium bicarbonate which comprises allowing ammonium bicarbonate to crystallize from a hot solution containing ammonium bicarbonate and a body increasing the surface tension of the solution, while passing a gas rich in carbon dioxid through the solution during crystallization.

4. The process of manufacturing stable ammonium bicarbonate which comprises allowing ammonium bicarbonate to crystallize from a hot solution containing ammonium bicarbonate and a small amount of an organic liquid insoluble in the solution and increasing its surface tension, while passing a gas rich in carbon dioxid through the solution during crystallization.

5. The process of manufacturing stable ammonium bicarbonate which comprises allowing ammonium bicarbonate to crystallize from a hot solution containing ammonium bicarbonate and a small amount of an organic liquid insoluble in the solution and increasing its surface tension together with a small amount of an alkylated naphthalene sulfonic acid, while passing a current of gas rich in carbon dioxid through the solution during crystallization.

6. The process of manufacturing stable ammonium bicarbonate which comprises allowing ammonium bicarbonate to crystallize from a hot solution containing ammonium bicarbonate and a readily volatile organic liquid insoluble in the solution and increasing its surface tension while passing a current of gas rich in carbon dioxid through said solution during crystallization.

In testimony whereof I have hereunto set my hand.

ERICH DEHNEL.

CERTIFICATE OF CORRECTION.

Patent No. 1,766,705.　　　　　　　　　　　　　　Granted June 24, 1930, to

ERICH DEHNEL.

It is hereby certified that error appears in the printed specification of the above numbered patent requiring correction as follows: Page 1, line 48, strike out the word "other"; line 74, strike out the word "furnace"; and that the said Letters Patent should be read with these corrections therein that the same may conform to the record of the case in the Patent Office.

Signed and sealed this 22nd day of September, A. D. 1931.

(Seal)
M. J. Moore,
Acting Commissioner of Patents.